United States Patent
Kobayashi et al.

(10) Patent No.: US 6,249,870 B1
(45) Date of Patent: Jun. 19, 2001

(54) DATA HIDING METHOD AND DATA EXTRACTION METHOD USING STATISTICAL EXAMINATION

(75) Inventors: Seiji Kobayashi; Akio Koide, both of Yokohama; Norishige Morimoto, Tokyo-to; Shuichi Shimizu, Yokohama, all of (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/999,578

(22) Filed: Dec. 24, 1997

(30) Foreign Application Priority Data

Dec. 26, 1996 (JP) .................................................. 8-348426
Sep. 12, 1997 (JP) .................................................. 9-247998

(51) Int. Cl.[7] ............................... H04L 9/00; G09C 5/00
(52) U.S. Cl. ........................... 713/176; 382/232; 380/54
(58) Field of Search ........................ 380/54, 55; 382/232; 713/176

(56) References Cited

U.S. PATENT DOCUMENTS

| | | | |
|---|---|---|---|
| 5,613,004 | * 3/1997 | Cooperman et al. | 380/28 |
| 5,636,292 | * 6/1997 | Rhoads | 382/232 |
| 5,689,587 | * 11/1997 | Bender et al. | 382/232 |
| 5,721,788 | * 2/1998 | Powell et al. | 382/100 |
| 5,822,436 | * 10/1998 | Rhoads | 380/54 |
| 5,825,892 | * 10/1998 | Braudaway et al. | 380/51 |
| 5,875,249 | * 2/1999 | Mintzer et al. | 380/54 |
| 5,889,868 | * 3/1999 | Moskowitz et al. | 380/51 |
| 5,905,800 | * 5/1999 | Moskowitz et al. | 380/28 |
| 5,907,618 | * 5/1999 | Gennaro et al. | 380/21 |
| 5,907,619 | * 5/1999 | Davis | 713/176 |

FOREIGN PATENT DOCUMENTS

| | | | |
|---|---|---|---|
| 851391 A2 | * 7/1998 | (EP) | . |
| 851392 A2 | * 7/1998 | (EP) | . |
| 852441 A1 | * 7/1998 | (EP) | . |

OTHER PUBLICATIONS

"Embedding Parametric Digital Signatures in Images", by Adrian G. Bors, et al., pp. 1701–1704.
"Embedding Robust Labels into Images for Copyright Protection", by Jian Zhao, et al., pp. 243–251.

* cited by examiner

Primary Examiner—Tod R. Swann
Assistant Examiner—Steve Kabakoff
(74) Attorney, Agent, or Firm—Scully, Scott, Murphy & Presser; Louis P. Hertzberg

(57) ABSTRACT

The invention makes it possible to properly certify a genuine owner, and to inhibit deterioration of image quality of media information to which an embedding operation is performed by adaptively determining amount of embedding for characteristic values such as pixel values. It includes a data hiding method for embedding message data into media data comprising the steps of obtaining a secondary key by inputting a key having a predetermined value to a specified function; determining hiding positions in which the message data will be embedded according to the obtained secondary key, and selecting one of plural hiding functions according to the secondary key so that the selected hiding function is used for each of the determined hiding positions; and embedding the message data into each of the determined hiding positions according to the selected hiding function corresponding to the hiding position.

18 Claims, 7 Drawing Sheets

| Sample Image | Standard Deviation of Pixel Values | Standard Deviation of $f_{S0}$ | Standard Deviation of $f_{S1}$ |
|---|---|---|---|
| 200000 RED | 68.3396 | 9.4510 | 9.0329 |
| 200000 GREEN | 59.6419 | 9.5007 | 9.0248 |
| 200000 BLUE | 60.9283 | 9.7633 | 9.2070 |
| 200001 RED | 58.7429 | 16.2642 | 17.1555 |
| 200001 GREEN | 54.6655 | 16.3756 | 17.1682 |
| 200001 BLUE | 53.0666 | 15.9594 | 16.8779 |
| 200002 RED | 52.5882 | 4.4696 | 8.5511 |
| 200002 GREEN | 45.1880 | 4.1811 | 8.1316 |
| 200002 BLUE | 37.9568 | 4.0256 | 7.8376 |
| 200011 RED | 16.0885 | 3.2931 | 3.4074 |
| 200011 GREEN | 18.8486 | 3.3313 | 3.4857 |
| 200011 BLUE | 21.4928 | 3.4299 | 3.6075 |

Figure 2

$$F_{J0}(j, k) = \begin{Bmatrix} 1 & 1 & 0 & 0 & -1 & -1 & 0 & 0 \\ 1 & 1 & 0 & 0 & -1 & -1 & 0 & 0 \\ 0 & 0 & -1 & -1 & 0 & 0 & 1 & 1 \\ 0 & 0 & -1 & -1 & 0 & 0 & 1 & 1 \\ -1 & -1 & 0 & 0 & 1 & 1 & 0 & 0 \\ -1 & -1 & 0 & 0 & 1 & 1 & 0 & 0 \\ 0 & 0 & 1 & 1 & 0 & 0 & -1 & -1 \\ 0 & 0 & 1 & 1 & 0 & 0 & -1 & -1 \end{Bmatrix}$$

Equation 20

Figure 3

$$F_{J1}(j, k) = \begin{Bmatrix} 0 & 0 & -1 & -1 & 0 & 0 & 1 & 1 \\ 0 & 0 & -1 & -1 & 0 & 0 & 1 & 1 \\ -1 & -1 & 0 & 0 & 1 & 1 & 0 & 0 \\ -1 & -1 & 0 & 0 & 1 & 1 & 0 & 0 \\ 0 & 0 & 1 & 1 & 0 & 0 & -1 & -1 \\ 0 & 0 & 1 & 1 & 0 & 0 & -1 & -1 \\ 1 & 1 & 0 & 0 & -1 & -1 & 0 & 0 \\ 1 & 1 & 0 & 0 & -1 & -1 & 0 & 0 \end{Bmatrix}$$

Equation 21

Figure 4

$$F_{J2}(j, k) = \begin{Bmatrix} 1 & 1 & 0 & 0 & -1 & -1 & 0 & 0 \\ 1 & 1 & 0 & 0 & -1 & -1 & 0 & 0 \\ 0 & 0 & 1 & 1 & 0 & 0 & -1 & -1 \\ 0 & 0 & 1 & 1 & 0 & 0 & -1 & -1 \\ -1 & -1 & 0 & 0 & 1 & 1 & 0 & 0 \\ -1 & -1 & 0 & 0 & 1 & 1 & 0 & 0 \\ 0 & 0 & -1 & -1 & 0 & 0 & 1 & 1 \\ 0 & 0 & -1 & -1 & 0 & 0 & 1 & 1 \end{Bmatrix}$$

Equation 22

Figure 5

$$F_{J3}(j, k) = \begin{Bmatrix} 0 & 0 & -1 & -1 & 0 & 0 & 1 & 1 \\ 0 & 0 & -1 & -1 & 0 & 0 & 1 & 1 \\ 1 & 1 & 0 & 0 & -1 & -1 & 0 & 0 \\ 1 & 1 & 0 & 0 & -1 & -1 & 0 & 0 \\ 0 & 0 & 1 & 1 & 0 & 0 & -1 & -1 \\ 0 & 0 & 1 & 1 & 0 & 0 & -1 & -1 \\ -1 & -1 & 0 & 0 & 1 & 1 & 0 & 0 \\ -1 & -1 & 0 & 0 & 1 & 1 & 0 & 0 \end{Bmatrix}$$

Equation 23

Figure 6

$$d(x)G_{JI}(j, k) = \begin{bmatrix} 0 & 0 & -4 & -4 & 0 & 0 & 4 & 4 \\ 0 & 0 & -4 & -4 & 0 & 0 & 4 & 4 \\ -4 & -4 & 0 & 0 & 4 & 4 & 0 & 0 \\ -4 & -4 & 0 & 0 & 4 & 4 & 0 & 0 \\ 0 & 0 & 4 & 4 & 0 & 0 & -4 & -4 \\ 0 & 0 & 4 & 4 & 0 & 0 & -4 & -4 \\ 4 & 4 & 0 & 0 & -4 & -4 & 0 & 0 \\ 4 & 4 & 0 & 0 & -4 & -4 & 0 & 0 \end{bmatrix}$$

Equation 27

Figure 7

$$w(x, y) = \begin{bmatrix} 0 & 0 & -3 & -4 & 0 & 0 & 4 & 3 \\ 0 & 0 & -4 & -4 & 0 & 1 & 3 & 4 \\ -3 & -4 & 0 & 0 & 4 & 3 & 1 & 0 \\ -4 & -4 & 0 & 0 & 4 & 4 & 0 & 0 \\ 0 & 0 & 4 & 4 & 0 & 0 & -4 & -4 \\ 0 & 1 & 3 & 4 & 0 & 0 & -4 & -3 \\ 4 & 3 & 1 & 0 & -4 & -4 & 0 & 0 \\ 3 & 4 & 0 & 0 & -4 & -3 & 0 & 0 \end{bmatrix}$$

Equation 28

Figure 8

$$F_{S0.0}(i,j) = \begin{pmatrix} 1 & -1 \\ 0 & 0 \end{pmatrix}$$

$$F_{S0.1}(i,j) = \begin{pmatrix} 0 & 0 \\ 1 & -1 \end{pmatrix}$$

Equation 30

$$F_{SS}(i,j) = \begin{pmatrix} 1 & 1 \\ -1 & -1 \end{pmatrix}$$

Equation 31

Figure 9

$$E_+(N,s) = \sum_{s'>s} P_N(s')$$

$$E_-(N,s) = \sum_{s'<s} P_N(s')$$

Equation 34

Figure 10

$$\begin{aligned}
\langle f \rangle_c &= 0 \\
\langle f^2 \rangle_c &= \langle f^2 \rangle - \langle f \rangle^2 \\
\langle f^3 \rangle_c &= \langle f^4 \rangle - 3\langle f^2 \rangle \langle f \rangle + 2\langle f \rangle^3 \\
\langle f^4 \rangle_c &= \langle f^4 \rangle - 4\langle f^3 \rangle \langle f \rangle + 6\langle f^2 \rangle \langle f \rangle^2 - 3\langle f \rangle^4
\end{aligned}$$

Equation 36

Figure 11

$$P_N(s)^{(0)} = \frac{1}{\sqrt{2\pi N \langle f^2 \rangle_c}} \exp\left(-\frac{(s - N\langle f \rangle)^2}{2N\langle f^2 \rangle_c}\right)$$

Equation 37

Figure 12

$$E_+(N, s)^{(0)} = \frac{1}{\sqrt{2\pi N \langle f^2 \rangle_c}} \int_s^\infty ds' \exp\left(-\frac{(s' - N\langle f \rangle)^2}{2N\langle f^2 \rangle_c}\right)$$

$$E_-(N, s)^{(0)} = \frac{1}{\sqrt{2\pi N \langle f^2 \rangle_c}} \int_{-\infty}^s ds' \exp\left(-\frac{(s' - N\langle f \rangle)^2}{2N\langle f^2 \rangle_c}\right)$$

Equation 38

Figure 13

$$Q_2(N, s) = \frac{u}{N}\left[\frac{(\langle f^4 \rangle_c - 3\langle f^2 \rangle_c^2)}{4!\langle f^2 \rangle_c^2}(w - 3) + \frac{\langle f^3 \rangle_c^2}{2!3!3!\langle f^2 \rangle_c^3}(w^2 - 10w + 15)\right]$$

Equation 43

Figure 14

DATA HIDING METHOD AND DATA EXTRACTION METHOD USING STATISTICAL EXAMINATION

FIELD OF THE INVENTION

The present invention relates to a data hiding method and a data extraction method to embed owner or copyright information (message information) into media information such as digital images, digital videos, or digital audio in an unperceptive manner. Particularly, it relates to a data hiding method to embed media information in an unperceptive manner while controlling the embedding operation for the information with a statistical examination. It also relates to a data extraction method to determine with the statistical examination whether or not the media information is embedded, and to properly retrieve the embedded information based on the determination.

BACKGROUND ART

The following technique has been known as a data hiding method with a statistical approach. First, two pixel point arrays, hereinafter called {an} and {bn}, are selected from the image data. Each respective pixel point array is composed of a number "n" of pixel points. Then, an embedding operation is performed by adding a fixed value c to the value v(an) of n pixels in point array {an}, while subtracting the fixed value c from the value v (bn) of "n" pixels in the other point array {bn}. Thus at each pixel "n", the value of the new array vO(an) and vO(bn) are given by v0 (an)=v (an)+c v0 (bn)=v (bn)−c  [Equation 1]

Whether or not embedding is conducted in image data is determined by calculating the average difference between the values of n pixels in both point arrays, and based on its result, as represented in the following formula.

$$\frac{1}{N}\sum_{n=1}^{N}(v'(a_n)) - v'(b_n))$$ [Equation 2]

That is, when an average is calculated for the differences between values of pixels when the number "n" is high enough such that a statistical property appears, it is expected that the average converges to zero if no addition (embedding) is conducted. On the other hand, if the addition (embedding) is conducted, it is expected that the average becomes a fixed value of 2c. Accordingly, whether or not the embedding operation is performed is determined on the basis of a fact whether the average is closer to 0 or 2c, within a set threshold value.

The information to be embedded is one bit, and the positions of the two selected pixel point arrays are confidential. These are known only to the person who performs the embedding (addition) operation. Since the average 2c cannot be retrieved by a person other than the person who performs the embedding operation unless the positions of pixel point arrays can be identified, the fact that this value can be extracted proves that the person is the owner of the data.

However, a problem with this conventional technique that uses the statistical approach, lies in that the identification of who is the owner of data can be easily made unclear by conducting a new embedding operation. That is, even if a third party does not manipulate the pixel value in the pixel point array known only to the owner, the average 2c can be newly produced in two other suitable pixel point arrays by selecting such pixel point arrays, and conducting the embedding operation on their pixel values. Therefore, when the third party who performed such operation falsely claims that he/she himself/herself is the owner based on the average that is calculated from the point array identified by him or her, the conventional technique cannot prove who is the genuine owner.

Another problem lies in that sufficient consideration is not given to the embedding operation and deterioration of image quality caused by it. Even if the same value c is added or subtracted, significant difference may occur in deterioration of visual image quality because of certain characteristics of the image quality. Therefore, it is preferable to adaptively change the amount of embedding, (c), depending on the characteristics of image quality. That is, it is preferable to adaptively select the fixed value c and the number of pixels N in the pixel point arrays.

SUMMARY OF THE INVENTION

An object of the present invention is to provide a data hiding method which enables it to be used to properly prove who is the genuine owner.

Another object of the present invention is to inhibit deterioration of image quality by adaptively determining the value of c to be added (embedded) to be dependent upon the characteristic values (such as pixel values in the medium information) on which the embedding processing is conducted.

A feature of the present invention is to use a key for selecting a pixel point array. This prevents false authentication of the owner. Another feature is to adaptively determine the size of selected pixel point array (N), and the magnitude of statistic amount (c) to be manipulated for the characteristic values. In retrieving the data, a calculation is performed to determine whether or not information is embedded in a region. This is used to determine whether or not the arithmetic operation is conducted on the characteristic values in that region. This also enables one to embed multi-bit information (author, distribution ID, and the like) in an image in an unperceptive manner, and to retrieve the embedded information from the image for claiming the ownership of the image or for identifying the distribution channel.

More specifically, an aspect of the present invention is a data hiding method for embedding one or more messages into data comprising the steps of: obtaining a secondary key by inputting a key having a predetermined value to a specified function; determining hiding positions in which the message will be embedded according to the obtained secondary key, and selecting one of many hiding functions according to the secondary key so that the selected hiding function is used for each of the determined hiding positions; and embedding the message into each of the determined hiding positions according to the selected hiding function corresponding to the hiding position.

Another aspect of the present invention is a data extraction method for extracting one or more messages from data in which each message is embedded in the image data. The method comprising the steps of: obtaining a secondary key by inputting a key having a predetermined value to a specified function; determining hiding positions in which the message is embedded according to the obtained secondary key, and selecting one of many hiding functions according to the secondary key so that the selected hiding function is used for each of the determined hiding positions; inputting information in the determined position to a detection basic function which is identified according to the determined hiding function; inputting an output of the detection basic function to a detection function; and determining whether the message is embedded according to an output of the detection function.

BRIEF DESCRIPTION OF THE DRAWINGS

These and other objects, features, and advantages of the present invention will become apparent upon further consideration of the following detailed description of the invention, when read in conjunction with the following figures, in which:

FIG. 2 is a table showing the result of characteristics of a detection basic function when they are applied to a test image.

FIGS. 3–9 are linear filters used as detection basic functions.

FIGS. 10–14 are formulae for obtaining detection basic functions.

DETAILED DESCRIPTION OF THE INVENTION

Figure 1:
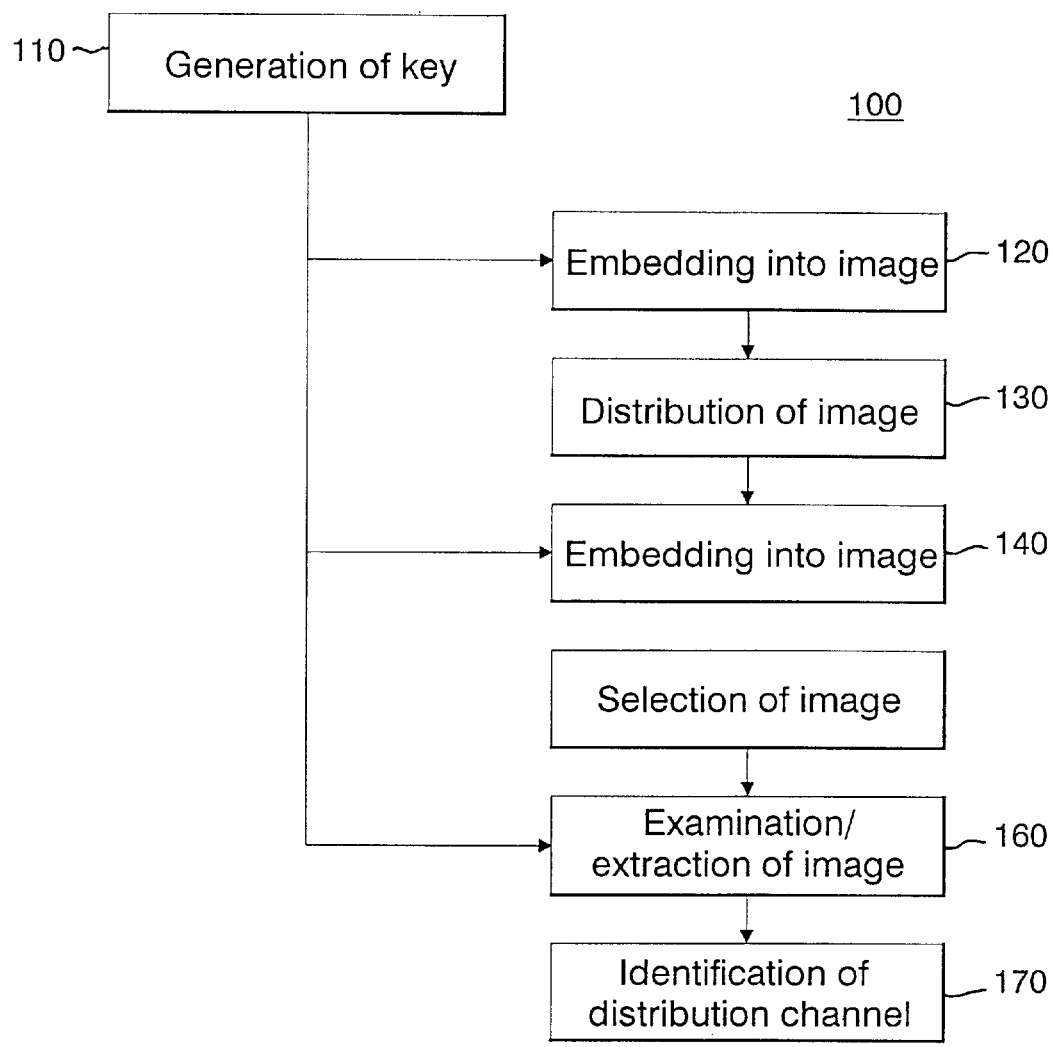
FIG. 1 is a diagram illustrating the relationship between distribution of an image and generation of a key in an embodiment.

FIG. 1 100, shows the relationship between distribution of an image and generation of a key. An image is distributed by first generating a key 110, and embedding multi-bit information into the image based on the key 120. If it is intended to encrypt and distribute an image 130, multi-bit information is additionally embedded in the decrypted image at the destination 140. Then, an image being distributed is detected on the basis of the key to see whether or not it violates the copyright. If so, its distribution channel is identified 170 from the extracted 160 bit information. In the following, first, a system is generally described for detecting whether or not embedding is performed in a digital content, and retrieving the bit information. Then, a system is generally described for detecting/embedding the multi-bit information. Furthermore, important concepts of an embodiment include the detection of a basic function and overwriting, a feature for calculating the detection function, determination of a false embedded certificate, and embedding utilizing a unidirectional function. These are described in detail.

(1) Detection/Retrieval System

The detection/retrieval system comprises:

a mechanism for determining a point array and a detection basic function from a given key;

a mechanism for obtaining a value at each point from the point array and the detection basic function, and for calculating their sum;

a mechanism for determining a detection function; and a mechanism for determining bit information and its probable reliability by applying the detection function to the calculated sum.

The point array is for determining a position where the digital content is embedded. It is an array of one-dimensional coordinates if the digital content is one dimensional, while it is an array of two-dimensional coordinates if the digital content is two dimensional. The point array is divided into a plurality of groups into each of which one-bit of information is embedded. Information of bit length corresponding to the number of groups is retrieved from the embedded digital content. Each point in the point array is represented as "Xna". The double suffix is conveniently appended to indicate that the point array is divided into a plurality of "n" groups, in which "a" represents the group to which it belongs.

The 'detection basic function' is a feature for calculating a value by using digital data near a specified point. Specific examples of the detection basic function will be described later. A common 'detection basic function' may be used for all points in a point array, while a different 'detection basic function' may be selected on the basis of the key for each point array from a plurality of 'detection basic functions'. To prevent a malicious third party from erasing the embedded information, it is arranged to select one of a plurality of detection basic functions for each point based on the key so that each point array has a 'different basic function'. The 'detection basic function' at a point Xna is represented as Fna in the following.

A value is determined for each point, based on the point array and its selected 'detection basic function', to calculate the point array sum Sa of the points in each group (suffix a).

$$S_a = \sum_{n=1}^{N_a} f_{na}(X_{na})$$ [Equation 3]

where Na is the number of points belonging to the group a, and may differ from one group to another. It is not necessary to maintain the point array and the detection basic function. It is sufficient to generate keys one after another and to destroy them as soon as the sum is added in an accumulation memory.

A 'detection function' is defined by assuming that point arrays and the 'detection basic function' are randomly selected, such as to provide a probability that where its point array sum is larger and lower than a certain value. The probability where the sum of point arrays of N is larger than S is represented as E+(N:S), while the probability where the sum is smaller than S is represented as E (N:S). In this case, the bit information and its probable reliability are found from the calculated sum Sa as follows:

$$E+(Na, Sa)>E-(Na, Sa)$$ [Equation 4]

It is determined that bit 0 is embedded if the above is satisfied, and E+(Na, Sa) is determined to be its reliability. On the contrary, if $$E+(Na, Sa)<E-(Na, Sa),$$ [Equation 5]

it is determined that bit 1 is embedded, and E−(Na, Sa) is determined to be its reliability. If equality is established, the probability is the same for bits 0 and 1. That is, the bit information cannot be detected. If the detection function is arranged to satisfy the following, then the above mechanism may be more simplified for determining the bit information and its probable reliability.

$$E+(N, S)+E-(N, S)=1$$ [Equation 6]

In this case, if $$E+(Na, Sa)>0.5,$$ [Equation 7]

then it is determined that bit 0 is embedded, and E+(Na, Sa) is determined to be its reliability. On the contrary, if $$E+(Na, Sa)<0.5,$$ [Equation 8]

then it is determined that bit 1 is embedded, and 1−E+(Na, Sa) is determined to be its reliability. Here, the detection rule for bit 0 and bit 1 may be reversed.

Whether or not bit information is embedded in a digital content is determined by the fact whether or not the reliability determined by an actual user of the subsystem for his or her purpose is exceeded. While the detection/extraction system requires random access to digital content data, the system may be configured as follows in order to process the digital content data as a data stream, instead of holding it in the memory region:

- a mechanism for determining which detection basic function F is used for the stream data of digital content from its position (point) and a given key, and to which sum Sa its value is added;
- a mechanism for temporarily obtaining the value of the detection basic function F, and adding it to the sum Sa for accumulation;
- a mechanism for accumulating data necessary for obtaining a detection function from the stream data; and
- a mechanism for obtaining a detection function after all stream data are processed, and applying the detection function to the accumulated sum Sa to determine bit information and its probable reliability.

(2) Overview of Embedding System

The embedding system comprises:

- a mechanism for determining a point array and a detection basic function and forming the given key;
- a mechanism for obtaining a detection function;
- a mechanism for determining the magnitude of the sum necessary to be embedded in the bit information from the probable reliability and the detection function; and
- a mechanism for manipulating digital data near each point in the point array while maintaining unperceptivity so that the sum determined from the detection basic function exceeds a predetermined value.

The point array and the detection basic function are represented as Xna and Fna, respectively. The number of point array groups generated by the embedding system from the key is generally arranged to be larger than the number used in the detection/extraction system. This is so that important statistical characteristics of the digital content are not changed by the manipulation, while the number of points Na belonging to individual groups 'a' should be arranged to be larger for a group for which the bit information is desired to be embedded with higher reliability. The detection function is represented as $$E+(N, S) \text{ or } E-(N, S).$$

When the bit information is embedded in the group a with reliability Pa or higher, embedding is performed for bit 0 so that the sum Sa of the detection function becomes $$E+(Na, Sa) > Pa. \quad \text{[Equation 9]}$$

Embedding is performed for bit 1 so that the sum sa of the detection function becomes $$E-(Na, Sa) > Pa. \quad \text{[Equation 10]}$$

Here, the reliability Pa is assumed to be larger than 0.5. That is, the reliability is arranged for bit 0 to be smaller than the sum of detection basic function which is Sa where E+(Na, Sa)=Pa, and for bit 1 to be larger than the sum of detection basic function which is Sa where E−(Na, Sa)=Pa. Here, the embedding rule for bits 0 and 1 may be reversed in the above bit embedding.

Since the detection function depends on the statistical characteristics of digital content, the number of point array groups in the embedding system is arranged to be larger than that in the detection/extraction system. Surplus groups are manipulated to cancel change in the statistical characteristics. Particularly, the embedding is performed by setting a target value of the sum of detection basic functions for surplus groups so that the average of detection basic functions for the entire digital content is not changed from what it was before the manipulation. The number of surplus group for cancellation may be one or more. Every time one bit is embedded, embedding is performed to cancel it so that the number of bit embedding groups are made equal to that of surplus groups.

The embedding operation is performed by manipulating values of points near each point Xna in the point array while maintaining unperceptivity. When the sum of detection basic functions is assumed to be $Sa^0$, $\Delta Sa = Sa - Sa^0$ is the target change range for each group. If the change range is made equal for each point in the point array, $\Delta Sa/Na$ is the target change range for the value of detection basic function at each point.

In order to provide resistance for tempering while maintaining unperceptivity, embedding is performed by manipulating values of points near each point Xna in the point array with a narrower change range for a region where the embedding is conspicuous, and with a wider change range for a region where the embedding is inconspicuous, instead of using an equal change range.

An index of unperceptivity is calculated for each point in a point array for embedding into the digital content, and a target change range is determined for the detection basic function to manipulate values of points near that point.

The index of unperceptivity is a value calculated from the values of digital content at points near a given point x, and includes the following types:

Proportion index: an index for providing perceptivity in a similar magnitude if the change range at each point x is proportional to the index g(x);

Recognition threshold index: an index for providing perceptivity in a similar magnitude if the change range at each point x is smaller than the index g(x);

Mixed index: an index combining the above.

For the proportional index, a proportional constant r is determined as follows, and rg(Xna) is made a target change range at each point Xna.

$$r = \Delta S_a \bigg/ \sum_{n=1}^{N_a} g(x_{na}) \quad \text{[Equation 11]}$$

For the recognition threshold index, if $$|\Delta S_a| \leq \sum_{n=1}^{N_a} g(x_{na}) \quad \text{[Equation 12]}$$

manipulation is sequentially conducted for each point Xna with a change range (Xna) in the direction of sign of $\Delta Sa$ until $\Delta Sa$ is exceeded. Then, the change manipulation is stopped at the point where it is exceeded, or the following manipulation is conducted for all points Xna.

$$g(X_{na})\Delta S_a \bigg/ \sum_{n=1}^{N_a} g(x_{na}) \quad \text{[Equation 13]}$$

In addition, if $$|\Delta S_a| \geq \sum_{n=1}^{N_a} g(x_{na})$$ [Equation 14]

the manipulation with the change range $$g(X_{na}) + (|\Delta S_a| - \sum_{n=1}^{N_a} g(x_{na}))/N_a$$ [Equation 15]

is performed for each point Xna according to the sign of Sa. For the mixed index, the embedding is performed by combining the above.

(3) Detection Basic Function and Overwriting

The key specifies a point array and a detection basic function. Here, description is given for the detection basic function, and the associated embedding operation, and the overwriting technique. The detection basic function is a mechanism for calculating values by using digital data at points near a specified point. The detection basic function is represented as fα, where α is a suffix for distinguishing a plurality of detection basic functions.

First, a description is given of a linear filter, for which the sum of coefficients is zero. Although, in principle, the detection basic function may take any form, since a digital content is typically provided in an array of integer values, it is desirable to be one that receives an integer value as input and outputs another integer value, and that, to efficiently satisfy the unperceptivity, values of the detection basic function are concentrated around their average with the change range of value being small at nearby points necessary for changing the values of detection basic function. More specifically, for the latter condition, when σ is assumed to be the standard deviation of detection basic function for the entire digital content, the detection basic function is desirable to be one in which the average of change range of values at nearby points necessary for increasing/decreasing the detection basic function by σ is smaller than the standard deviation of values of every point for the entire digital content.

A detection basic function with such features includes a linear filter represented by the following equation:

$$f_a(x) = \sum_y F_\alpha(y)v(x+y)$$ [Equation 16]

where v (x+y) is the value of digital content at a point moved from the point x by y, and the coefficient of filter Fα(y) is an integer expressed by $$0 = \sum_y F_\alpha(y)$$ [Equation 17]

X and y are two-dimensional vectors for digital images and digital videos. The reason why the sum of the coefficients is made zero is to make the embedded information not to depend on an absolute value of digital data at that point, but to depend on the behavior of digital data around that point, or a relative value. For example, consider the following as the simplest linear filter for digital image. The coefficient of the detection basic function $F_{S0}$ is given by $$(F_{S0}(0, 0); F_{S0}(1, 0)) = (1, -1),$$ [Equation 18]

and the coefficient of the detection basic function FS1 is given by $$(F_{S1}(0, 0); F_{S1}(0, 1)) = (1, -1)$$ [Equation 19]

FIG. 2 shows a table where the characteristics of the detection basic function are applied to test images. The standard deviation of each detection basic function is considerably smaller than the standard deviation of pixel values. Therefore, it is expected that a narrower change range can be employed by using FS0 and FS1 as the detection basic function, instead of using the pixel values themselves as the detection basic functions.

To meet JPEG and MPEG needs, linear filters are used as the detection basic functions with width and height matching with an 8×8 block for DCT conversion, that is, linear filters of 4×4, 4×8, 8×4, 8×8, 16×8, 8×16, or 16×16. For example, the following 8×8 filters fJ0, fJ1, fJ2, and fJ3 are used:

[Equation 20] shown in FIG. 3
[Equation 21] shown in FIG. 4
[Equation 22] shown in FIG. 5
[Equation 23] shown in FIG. 6

The target change value Δfα(X)=fα(x)'−fα(x) is determined for the value of the 'detection basic function' at each point in a point array by using the unperceptivity index. Here, detailed description in the case of a linear filter is given for the operation on digital data at each point near points in the embedding point array to attain such target change value. In the following, a change value is represented as w(x, y) for each point (x+y) near a point x in the embedding point array. That is, the value of digital data v(x+y) at a point (x+y) is converted into v(x+y)+w(x, y).

A coefficient Gαl(y), $$\sum_y F_\alpha(y)G_\alpha(y) = D_\alpha > 0$$ [Equation 24]

is defined for the coefficient Fα(y) of linear filter for the detection basic function fa. Then, d(x) is obtained from $$d(x) = \Delta F_\alpha(x)/D_\alpha$$ [Equation 25]

The change value is obtained from $$w(x,y) = d(x)G_\alpha(y)$$ [Equation 25]

A selected simplest coefficient Gα(y) is Gα(y)=Fα (y). If the absolute value of d(x) is larger than 1, the unperceptivity is enhanced by slightly changing and averaging the value of d(x) Gα(y) so that the value gradually changes. For example, if d(x)=4 for GJ1(j,k) =FJ1(j, k), instead of using [Equation 27] shown in FIG. 7
its average,
[Equation 28] is shown in FIG. 8
is used.

The following approaches are used for embedding a plurality of messages with overwriting:

Orthogonal embedding; and
Layered embedding.

Here, the orthogonal embedding is to overwrite bits by using detection basic functions which are highly indepen dent of each other. In the case of the linear filter, it is performed a set of orthogonal coefficients:

$$\sum_y F_\alpha(y) G_\beta(y) = D_\alpha \neq 0 \quad \text{if } \alpha = \beta \qquad \text{[Equation 29]}$$
$$= 0 \quad \text{otherwise}$$

If $\alpha$ and $\beta$ differ each other, the embedding performed with $w(x, y) = d(x) G\beta(y)$ is not detected by the detection basic function fa given by the coefficient $F\alpha$ (y).

In addition, the layered embedding means a case where, when, between detection basic functions having different sizes for the regions to which they are applied, the smaller region to which one detection function is applied is enlarged in the form to the larger region to which the other function is applied, they have high independence. For example, a linear filter fS0 with a 2×1 size can be enlarged to the following linear filter with a 2×2 size:

[Equation 30] and [Equation 31] are shown in FIG. 9

They are orthogonal with the following linear filter in terms of the above orthogonal embedding. Accordingly, FSS and FS0 can be overwritten.

Here, calculation of the detection function is described. When a digital content is determined, the frequency that the detection basic function fa has a value F is counted for the entire content to produce a frequency distribution (histogram) h(f). It is calculated for a probability p(f) where the detection basic function $f\alpha$ is the value f as follows:

$$p(f) = h(f) \Big/ \sum_f h(f) \qquad \text{[Equation 32]}$$

Even if a histogram is produced by calculating the value of the 'detection basic function' $f\alpha$ for randomly selected points, rather than calculating it for all points in the content, there is no problem in practical use if a sufficiently large number of points are selected. A probability PN(s) where the sum of N detection basic functions is s is found from the resulting probability p(f) according to the following equation:

$$P_N(s) = \sum_{f_1} \sum_{f_2} \cdots \qquad \text{[Equation 33]}$$
$$\sum_{f_{N-1}} p(f_1) p(f_2) \ldots p(f_{N-1}) p(s - f_1 - f_2 \ldots - f_{N-1})$$

The detection function can be obtained by using this as follows:

[Equation 34] shown in FIG. 10.

Approximate Calculation of Detection Function

In the following, a method for approximately obtaining a detection function from a statistical moment of a detection basic function or average of powers <fn> is described as a method for efficiently obtaining the detection function. Here, the statistical moment is assumed to be calculated from $$\langle f^n \rangle = \sum_x \sum_\alpha f_\alpha(x)^n \Big/ \sum_x \sum_\alpha 1 \qquad \text{[Equation 35]}$$

As described below, since it is not necessary to calculate the probability PN(s) from the histogram h (f), the amount of memory and calculation can be maintained at a low level. The equation $\langle f^{nc} \rangle = \langle (f - \langle f \rangle)^n \rangle$ simplifies the equation

[Equation 36] shown in FIG. 11.

Here, it is possible to approximate as

[Equation 37] shown in FIG. 12, for sufficiently large N. Thus, the detection function can be given by:

[Equation 38] shown in FIG. 13.

Correction terms $E+(N, S)^{(n)}$ and $E-(N, S)^{(n)}$ in the approximated detection function are calculated as follows:

$$E+(N, S)^{(n)} = -Q_n(N, S) P_N(S)^{(0)}$$
$$E-(N, S)^{(n)} = Q_n(N, S) P_N(S)^{(0)} \qquad \text{[Equation 39]}$$

For simplicity, if $$v = s - N\langle f \rangle \qquad \text{[Equation 40]}$$

and $$w = \frac{(s - N\langle f \rangle)^2}{N\langle f^2 \rangle_c} \qquad \text{[Equation 41]}$$

Qn(N, s) is given by the following:

$$Q_1(N, s) = \frac{\langle f \rangle_c^3}{3! \langle f^2 \rangle_c} (w - 1) \qquad \text{[Equation 42]}$$

[Equation 43] shown in FIG. 14.

When the detection function including the correction items is evaluated by $E+^{(0)}+E+^{(1)}$, $E+^{(0)}+E^{(1)}+E+^{(2)}$, $E-^{(0)}+E-^{(1)}$, and $E-^{(0)}+E-^{(1)}+E-^{(2)}$, if it provides a negative value, it is replaced with zero.

Strict Calculation of Detection Function

To efficiently obtain the probability PN(s) without approximation, a recurrence formula $$P_{N+N'}(s) = \sum_{s'} P_N(s') P_{N'}(s - s') \qquad \text{[Equation 44]}$$

is used. For example, for N=2M, it is sufficient to repeat the above recurrence formula M times. Its disadvantage is memory size. It is used in a trial or the like where approximation is detested.

False Certificate of Embedding

When digital content is determined, the following point array is obtained by counting the frequency where the detection basic function fa has the value f for the entire content, producing a frequency distribution (histogram) h(f), manipulating the frequency distribution h(f) to produce a frequency distribution ha (f) corresponding to the point array:

causing the sum of detection basic function on the point array to exceed a target value;

causing the sum of detection basic function on the point array to be close to the target value; and causing the sum of detection basic function on two point arrays to be close to the target value.

If there is no key system with a unidirectional function, it is possible to produce false certificate that embedding has been performed in a digital content into which bit information is not embedded with this system. The present invention is described in detail in the following.

When it is assumed that the frequency distribution of detection basic function values over the entire digital content is h(f), and that the frequency distribution of detection basic function values for the point array group a is ha(f), $$0 < h_a(f) < h(f) \quad \text{[Equation 45]}$$

is satisfied for all f, the sum of detection basic function values in the point array group a is given by $$s_a = \sum_f f h_a(f) \quad \text{[Equation 46]}$$

and the number of points in the point array group a is given by $$N_a = \sum_f h_a(f) \quad \text{[Equation 47]}$$

In this case, $$S_a/N_a = -S_b/N_b = c \quad \text{[Equation 48]}$$

is substantially established for the bit extraction condition formula (Equation 1) described for the background art to obtain ha (f) and hb (f) with $$N_a = N_b = N \text{ and } h_a(f) + h_b(f) < h(f). \quad \text{[Equation 49]}$$

In addition, when it is noticed that the bit extraction condition with the detection function according to the present invention is approximately close to the normal distribution, if Na for the detection function is large, the following equation is established for bit 1:

$$s_a/\sqrt{N_a} \geq c \quad \text{[Equation 50]}$$

On the other hand, the following equation is established for bit 0:

$$s_a/\sqrt{N_a} \geq -c \quad \text{[Equation 51]}$$

$$\sum_a h_a(f) \leq h(f) \quad \text{[Equation 52]}$$

Thus, ha(f) is obtained.

A system for creating a certificate of false embedding produces a frequency distribution h from the digital content with the first scanning, then, produces a frequency distribution ha satisfying the above from h (f), and selects ha(f) of points f=f(x) from the digital content with the second scanning, thereby their aggregation being made a point array for false embedding.

The frequency distribution ha is produced from the entire frequency distribution h by repeating for all a the basic operation which calculates f under a predetermined rule described later until the sum Σfha(f) reaches a value Na with ha(f)=0 as the initial value, decrements h(f) by 1 and increments ha(f) by 1 if h(f) is positive. The loop for a is inside.

To produce the frequency distribution ha for the bit extraction condition with the detection function, the basic operation is performed in the descending order of f for the frequency distribution used for embedding bit 1, and in the ascending order of f for the frequency distribution used for embedding bit 0.

The bit extraction condition formula (Equation 1) described for the background art operates as follows. With DeltaO (+)=0, Delta0(−)=0 as the initial values, fna close to $$f_{na} = c + \Delta_n(+) \quad \text{[Equation 53]}$$

is found, and the basic operation is conducted on ha to obtain $$\Delta_{n+1}(+) = c + \Delta_n(+) - f_{na} \quad \text{[Equation 54]}$$

Then, fnb close to $$f_{nb} = -c + \Delta_n(-) \quad \text{[Equation 55]}$$

is found, and the basic operation is conducted on hb to obtain $$\Delta_{n+1}(-) = c + \Delta_n(-) - f_{nb} \quad \text{[Equation 56]}$$

The final error is given by ΔN (+)=N and ΔN (−)=N.

Embedding Utilizing Bidirectional Function

As described above, predetermined bit information can be extracted from a non-embedded digital content with selection of a point array as if it is embedded. Therefore, it cannot be determined whether or not a person is the owner of the digital content only by the fact that the point array for extracting the predetermined bit information from the digital content is known. While, as a solution to this problem, it is possible to previously register with a fair third party organization the fact that bit information is embedded in a specific digital content with a specific point array, this solution has the following shortcomings:

Registration needs to be performed for every embedding. This entails paying a fee for the registration.

Since the embedded point array is registered with a third party organization, the risk that the secret of embedded point array may be exposed is increased, and the embedded information is exposed to the risk that it may be erased.

Thus, it is claimed as our invention a method and system for embedding bit information as a solution to the problem of false certificate of owner. The solution provides an approach for determining an embedding position from an integer value (hereinafter called a "key") with a unidirectional function, wherein the "key" is secret and is known only to an owner him/herself. As long as this method is employed, even if a point array for a false certificate of owner can be obtained from a specific digital content, because the "key" for deriving the point array cannot be calculated due to the characteristics of unidirectional function, it is impossible to provide a false certificate of owner from knowing a private key.

The method for producing a point array for determining a position where embedding is performed from a key using a unidirectional function can be implemented by generating a "secondary key" using the unidirectional function, and producing the point array from the "secondary key." Since both the key and the "secondary key" are non-negative integer values, an ordinary unidirectional function may be used. A method is also implemented for determining a position into which embedding is performed from a key using the unidirectional function through production of a "secondary key" from the key using the unidirectional function.

Now, a detailed description is given describing a method for generating a point array from a "secondary key." A digital content is divided into N regions, each of which has a number assigned. Here, the number is represented as n. Each region n is divided into M sub-regions to which a detection base function is applied, and to each of which a number is assigned. In addition, it is assumed that the detection basic function is selected from among L detection basic functions. In this case, the secondary key selects the number mn of a sub-region from each sub-region n, and the detection basic function fln which is applied to this sub-region. That is, it is assumed that the secondary key (non-negative integer) k generates an integer $$j = \sum_{n=0}^{N-1} L^n M^n (m_n + M l_n) \quad \text{[Equation 57]}$$

for determining the sub-region and the detection basic function. A possible range (bit length of k) for the secondary key is usually shorter than a possible range (bit length of j) for an integer j. Accordingly, if k0 is assumed to be the secondary key, the sub-region and the detection basic function are determined by sequentially calculating ki+1 from ki, and then calculating $$j = \sum_{i=0} K^i k_i. \quad \text{[Equation 58]}$$

Here, K is the upper limit of non-negative integer ki. The mechanism for calculating ki+1 from ki may be a unidirectional function or an ordinary arithmetic operation. It is desirable to be a one-to-one function. Mn and ln from the integer j can be bit calculated by taking the number M of sub-regions and the number L of detection basic functions as powers of 2.

As described, the present invention can properly certify who is the genuine owner of image data and can inhibit deterioration of image quality of media information to which the embedding operation is performed by adaptively determining an amount of the operation for characteristic values such as pixel values. The concepts of the invention may be performed in other manners than those described, as known to those skilled in the art. These are also considered part of the present invention and included by the claims that follow.

What is claimed is:

1. A data hiding method for embedding a message comprising one or more digital data bits into an array of data, said method comprising the steps of:

obtaining a secondary key by inputting a secret first key to a specified public unidirectional function, said second key specifying said array of data and detection basic functions for calculating values based on data near points in said array;

determining a plurality of point array groups from said array of data in which said message is to be embedded according to said secondary key, an amount of point array groups corresponding in number to an amount of digital data bits in said message, and selecting one corresponding detection basic function from a plurality of detection basic functions according to said secondary key so that said detection basic function is applied to each point of said point array groups at a time of detection; and embedding each bit into its corresponding point array group by manipulating digital data near each point in the point array group to achieve a desired sum of detection basic function values over the point array group.

2. A method as recited in claim 1, wherein said array of data is comprised of pixel data or an image.

3. A method as recited in claim 2, wherein each of the hiding positions is comprised of a pixel point array of pixels, each of the pixels having at least one characteristic value.

4. A method as recited in claim 3, wherein the step of embedding is comprised of adaptively ascertaining a size of each pixel point array and a magnitude for manipulating said characteristic value.

5. A method as recited in claim 4, wherein said step of ascertaining the magnitude employs statistics of a plurality of characteristic values for the pixel point array.

6. A method as recited in claim 1, wherein said message is a fixed constant.

7. A method as recited in claim 1, further comprising the steps of generating the first key in a random fashion.

8. A data extraction method for extracting a message comprising one or more digital data bits from an array of data in which the message is embedded, said method comprising the steps of:

specifying said array of data and detection basic functions for calculating values based on data near points in said array according to a secondary key;

determining a plurality of point array groups from said array of data in which said message is embedded according to said secondary key, an amount of point array groups corresponding in number to an amount of digital data bits in said message, and selecting one corresponding detection basic function at each point of point array groups from a plurality of detection basic functions according to said secondary key;

inputting neighboring array data of each point in said point array group to the selected detection basic function for that point, calculating a function value for each point in said point array group and accumulating a sum of values calculated for each point array group;

inputting said accumulated sum of output values for each group to a detection function; and determining with probable reliability whether a digital data bit is embedded in each of said point array groups according to an output of said detection function.

9. A method as in claim 8, further comprising a step of ascertaining whether or not information is embedded in a subset of the array of data.

10. A method as in claim 9, wherein said step of ascertaining includes determining whether or not an arithmetic operation was conducted on the subset.

11. A method as in claim 8, wherein said array of data is comprised of an array of pixels of an image.

12. A method as in claim 8, wherein said message is comprised of multi-bit information.

13. A method as in claim 12, wherein said multi-bit information is not perceived by a normal eye.

14. A data hiding method for embedding a message comprising one or more digital data bits into an array of data comprising the steps of:

obtaining a secondary key by inputting a secret first key to a specified public unidirectional function;

determining a plurality of point array groups in which said message will be embedded according to said obtained secondary key, an amount of point array groups corresponding the number to an amount of digital data bits in said message, and selecting one of plural detection basic functions for a corresponding hiding position in point array groups according to said secondary key so that said selected detected basic function is used for each of said determined hiding positions at a time of detection; and embedding each bit of the message into its corresponding point array group by manipulating neighborhoods of said hiding positions according to said selected detection basic function, wherein each neighborhood comprises a group of pixels for computing a function value, said embedding step including adaptively determining a function value to be modified in said group of pixels according to values of surrounding pixels for each pixel in said group in order to achieve a desired unperceptivity and statistical characteristic.

15. A data extraction method for extracting message comprising one or more digital data bits from data in which the message is embedded comprising the steps of:

determining a plurality of point array groups in which said message is embedded according to a key, an amount of point array groups corresponding in number to an amount of digital data bits in said message, and selecting one of plural detection basic functions according to said key so that said selected detection basic function is used for a determined hiding positions in each said point array group;

inputting neighoring array data of each point in said point array group to said detection basic function and generating an output of said detection basic function;

calculating a function value for each point in said point array group and accumulating a sum of values calculated for each group;

inputting said accumulated sum to a detection function; and determining with probable reliability whether a digital data bit is embedded according to an output of said detection function.

16. The method as claimed in claim 1, wherein performance of said embedding step according to said detection basic function further includes:

applying said detection basic function at each point in a point array group to determine a point value; and, accumulating a sum of point values for each group to obtain a point array sum, said step of manipulating data being performed such that said sum exceeds a predetermined value based on a detection function for determining bit information and its probable reliability.

17. The method as claimed in claim 16, wherein said embedding step further includes the step of specifying a target change range for each point during application of said detection basic function to enable said accumulated sum to exceed said predetermined value.

18. The method as claimed in claim 17, wherein said step of specifying a target change range includes the step of calculating an index of unperceptivity for each point in said point array group, said index being of a value calculated from the values of points near a given point in said array.

* * * * *